W. SPARKS.
FLOAT.
APPLICATION FILED JAN. 9, 1919.
1,340,572. Patented May 18, 1920.
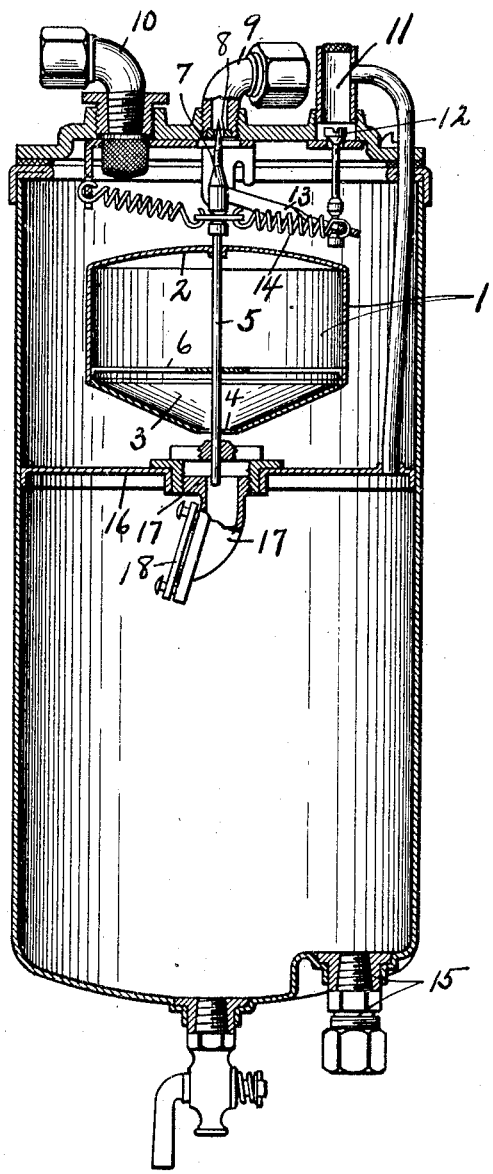
William Sparks, INVENTOR
BY Denison Thompson
ATTORNEYS

UNITED STATES PATENT OFFICE.

WILLIAM SPARKS, OF JACKSON, MICHIGAN.

FLOAT.

1,340,572.  Specification of Letters Patent.  Patented May 18, 1920.

Application filed January 9, 1919. Serial No. 270,367.

*To all whom it may concern:*

Be it known that I, WILLIAM SPARKS, a citizen of the United States of America, and resident of Jackson, in the county of Jackson, in the State of Michigan, have invented new and useful Improvements in Floats, of which the following, taken in connection with the accompanying drawings, is a full clear, and exact description.

This invention relates to certain improvements in floats, and pertains particularly to sheet metal floats, heretofore formed airtight from sections secured together in some suitable way as by soldering or the like.

The primary object of the invention is to render sheet metal float construction more permanent by obviating the physical phenomena known as "breathing" which is common to all hollow air tight floats under variation in external pressure, and results in leaks at the joints between the sections of which such floats are commonly formed.

Other objects and advantages relate to the details of form and construction as applied to this type of float.

In the drawings:—

The figure is a sectional view of a float of this invention shown as assembled in connection with a vacuum tank.

As stated, the drawing illustrates the float assembled in connection with a vacuum tank, the latter being of the form and construction shown in Letters Patent 1,255,347, issued to me February 5, 1918.

The float, as shown, consists of a hollow substantially cylindrical body —1—, having its upper end closed by cross wall —2—, and its lower end partially closed by a conical wall —3—, having a central opening —4— which is of desired shape and size. My experiments have shown that the downwardly tapered or conical wall —3— is of great advantage in connection with an open bottom float. This float may be made of sections, and the sections may be of any desired shape and form to constitute the complete structure, and may be secured together in any suitable way. The open bottom avoids "breathing" of the float by neutralization of air pressure.

This float is adapted for use in connection with numerous and varied apparatus, quite distinct with that in connection with which it is here shown, the drawings being purely illustrative of one structure in connection with which this float may advantageously be used. The vacuum tank structure forms no portion of the present invention excepting so far as the float of this invention may be peculiarly adapted for combination with the structure of the tank disclosed.

As illustrated, the float carries a valve stem —5— secured to the wall —2— of the float, and to a cross bar —6— positioned within and extending diametrically of the float. This stem carries a suitable valve —7— for contact with valve seat —8—, in connection with the air exhaust-pipe —9— ordinarily connected to the manifold of the engine for suction transfer.

The tank is further provided with a suitable fuel inlet pipe —10—, and an air vent —11—, the air vent being controlled by a valve —12— operated by a lever —13— through the medium of spring —14—, one end of which moves with the float. The tank itself consists of a tubular body portion closed at its lower end by a wall except for the outlet pipe —15—, and the tubular body is divided into two chambers by cross wall —16—, having a central opening within which nipple —17— is secured for the passage of liquid fuel from one chamber to the other, under control of valve —18—. The operation of this structure is well understood and need not here be further described.

Although I have shown and described one particular form, shape, and exact construction of float I do not desire to limit myself to the same as various changes and modifications may be made in the details of form and construction, without departing from the spirit of this invention as set forth in the appended claim.

What I claim is:

A float comprising a vertically disposed substantially cylindrical portion, an upwardly arched top wall secured to the upper edge of the cylindrical portion, a downwardly tapered conical lower wall connected to the lower edge of the said cylindrical portion, said lower wall having its central portion formed with an opening, a diagonally disposed cross wall connected to the said cylindrical portion adjacent to the lower edge thereof, and a valve stem extending through the said opening in the lower wall and through the upper wall and the said cross wall and rigidly secured to the said upper wall and the said cross wall.

In witness whereof I have hereunto set my hand this 21st day of December, 1918.

WILLIAM SPARKS.

Witnesses:
LILLIAN WUNDERLICH,
IRENE KELLY.